Patented Apr. 24, 1928.

1,667,053

UNITED STATES PATENT OFFICE.

HERBERT SCHOTTE, OF BERLIN-WILMERSDORF, GERMANY, ASSIGNOR TO THE FIRM CHEMISCHE FABRIK AUF ACTIEN (VORM. E. SCHERING), OF BERLIN, GERMANY.

DIACYL ISOTHIOCARBAMIDE ETHER AND METHOD OF PRODUCING SAME.

No Drawing. Application filed July 12, 1926, Serial No. 122,043, and in Germany July 16, 1925.

My invention refers to new chemical compounds being derivatives of thiocarbamide, and its particular object is the production of diacyl isothiocarbamide-S-alkyl ethers, which hitherto had not been produced, and which are designed to form intermediate products for use in the production of pharmaceutical and other preparations.

The investigations of Bernthsen and Klinger (Berichte d. deutsch. chem. Ges. 11/1878/493) as well as Claus (Berichte d. deutsch. chem. Ges. 8/1875/41) have shown the free alkyl ethers of isothiocarbamide to be very readily decomposable compounds. While it is possible to obtain a solution of the free carbamide derivative, it has never been isolated in pure condition. In consequence thereof it had to be expected that the acylization of the carbamide derivative in a caustic alkaline medium would be difficult. Contrary to the results obtained by Wheeler and Johnson (Journ. americ. chem. Soc. 29, 479, 1902) and Wheeler and Merriam (Journ. americ. chem. Soc. 23, 293, 1901), who in operating in the manner described only obtained monoacyl derivatives, I have succeeded in obtaining diacyl-S-alkyl isothiocarbamide by operating in accordance with Schotten-Baumann, however, the products obtained were soiled by acyl mercaptane and salts of thiocarbamide.

I have now ascertained that the acylization proceeds much easier and renders better yields, if acyl chloride is caused to act on the solution of a salt of a S-alkyl isothiocarbamide in a weak organic base, preferably in pyridine. For, in contradistinction to caustic alkali and to primary and secondary amines, pyridin does not decompose the isothiocarbamide ethers and its acyl derivatives.

In practising my invention I prefer proceeding for instance as follows:

Example 1.

37 grams of S-ethyl isothiocarbamide hydrobromide are dissolved in about 100 ccms. of dry pyridine, and 56 grams of benzoyl chloride are added under slight cooling. After a short time the product of reaction is introduced into water, the crystals are freed from the liquor by suction and are washed with alcohol and ether. There is obtained dibenzoyl S-ethyl isothiocarbamide in a yield approaching the calculated yield. The compound melts at 111–112° C., is insoluble in water and dissolves with great difficulty in alcohol and more easily in ether. The reaction occurs according to the formula

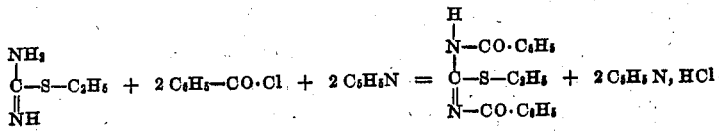

Example 2.

37 grams of S-ethyl isothiocarbamide are dissolved in about 200 grams of pyridine. To this solution is added a solution of 80 grams of p-nitrobenzoyl chloride in ether and the mixture is treated further as described with reference to Example 1. The dinitrobenzoate of the S-ethyl isothiocarbamide is substantially less readily soluble than the benzoate, and after being purified by dissolving in alcohol, melts under foaming at about 216° C. The reaction occurs according to the formula

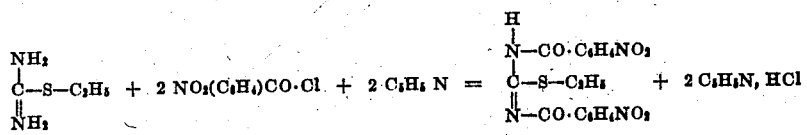

Example 3.

If 37 grams of S-ethyl isothiocarbamide bromide are dissolved in 100 ccms. of pyridine under cooling, and 16 grams of acetyl chloride are added, there results the diacetate of S-ethyl isothiocarbamide. The new compound forms an oily substance, dissolving with difficulty in ether, more readily in alcohol and acetone, with great difficulty in water and, if treated with primary or secondary amines, develops mercaptane. The reaction occurs according to the formula

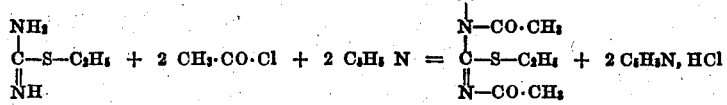

Example 4.

37 grams of S-ethyl isothiocarbamide bromide, on being dissolved in 100 ccms. of pyridine, will react with 45 grams of ethyl chloro carbonate to form the dicarbethoxy derivative, which melts at about 45° C. and is soluble in ether only with great difficulty. The reaction occurs according to the formula

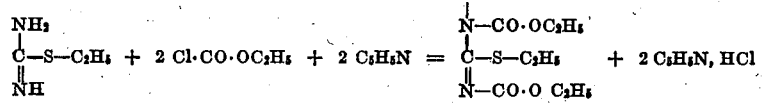

Example 5.

22 grams of S-methyl-isothiocarbamide hydro iodide are dissolved in 80 ccms. of dry pyridine and 30 grams of benzoyl chloride are slowly added under good cooling. Heating is preferably avoided in order to prevent the mixture from coloring brown owing to the separation of iodide. By introducing the solution into water after 10–12 hours the pyridine and the benzoic acid are dissolved and the crystals of 1,3-dibenzoyl-2-methyl thiocarbamide are freed from the solution by suction. They dissolve readily in acetone, ether and acetic ether, less readily in alcohol, are almost insoluble in water, decompose on being heated with caustic alkali, and are converted into mercaptane and dibenzoyl diethyl guanidine when treated with diethyl amine. The reaction occurs according to the formula

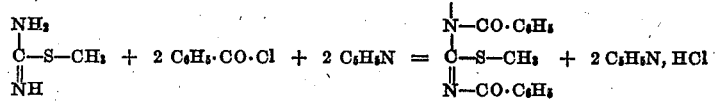

Example 6.

23 grams of S,N-dimethyl-isothiocarbamide hydro-iodide, on being dissolved in 100 ccms. of pyridine, react with 16 grams of acetyl chloride under vigorous generation of heat. There is formed 1,3-diacetyl-1,2-dimethyl isothiocarbamide, an oily substance not fit for distillation, which is insoluble in water, but soluble in organic solvents. The reaction occurs according to the formula

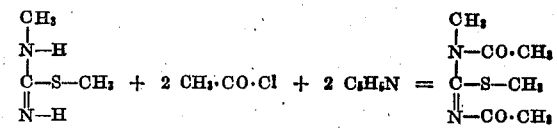

In place of pyridine also other weak organic bases such as dimethyl aniline or quinoline can be used. The analogous reaction will occur, if other salts of S-alkyl isothiocarbamide are subjected to similar treatment.

Various changes may be made in the details of the operation and particularly in the proportions of the ingredients present in the solutions used without departing from the invention or sacrificing the advantages thereof.

I claim:—

1. The method of producing diacyl isothiocarbamide-S-alkyl ethers comprising acting with an acyl chloride on the solution of a salt of an S-alkyl isothiocarbamide in a weak organic base.

2. The method of producing diacyl isothiocarbamide-S-alkyl ethers comprising acting with an acyl chloride on the solution of the salt of an S-alkyl isothiocarbamide in pyridine.

3. The method of producing diacyl isothiocarbamide-S-alkyl ethers comprising acting with a benzoyl chloride on the solution of the salt of an S-alkyl isothiocarbamide in pyridine.

4. The method of producing dibenzoyl-S-ethyl-isothiocarbamide comprising dissolving 37 grams of S-ethyl isothiocarbamide hydrobromide in 100 ccms. of dry pyridine and adding 56 parts of benzoyl chloride.

5. As a new product, the diacyl isothiocarbamide ethers having the formula $$\begin{array}{c} X \\ | \\ N-CO\cdot R_2 \\ | \\ C-S-R_1 \\ \| \\ N-CO\cdot R_2 \end{array}$$

wherein X is a hydrogen atom or a univalent radical, while $R_1$ and $R_2$ may be any univalent radicals either of the same or of a different kind, these ethers being neutral bodies dissolving only with difficulty in water, being soluble in most organic solvents and colorless provided that no chromophoric groups are present in the molecule.

6. As a new product, the diacyl isothiocarbamide ethers having the formula $$\begin{array}{c} H \\ | \\ N-CO\cdot R_2 \\ | \\ C-S-R_1 \\ \| \\ N-CO\cdot R_2 \end{array}$$

wherein $R_1$ and $R_2$ may be any univalent radicals either of the same or of a different kind, these ethers being neutral bodies dissolving only with difficulty in water, being soluble in most organic solvents and colorless provided that no chromophoric groups are present in the molecule.

7. As a new product, the diacetate of S-ethyl isothiocarbamide, being an oily substance dissolving with difficulty in ether, more readily in alcohol and acetone, with great difficulty in water and, if treated with primary or secondary amines, developing mercaptane.

8. As a new product, the diacyl isothiocarbamide ethers having the formula $$\begin{array}{c} H \\ | \\ N-CO\cdot R_2 \\ | \\ C-S-R_1 \\ \| \\ N-CO\cdot R_2 \end{array}$$

wherein $R_1$ is any univalent radical and $R_2$ any univalent aliphatic radicals, the products being colorless neutral bodies soluble in most organic solvents but dissolving in water only with difficulty.

In testimony whereof I affix my signature.

HERBERT SCHOTTE.